United States Patent
DeBello

(10) Patent No.: US 6,209,570 B1
(45) Date of Patent: Apr. 3, 2001

(54) AUTOMATIC FLUSH VALVE

(75) Inventor: Frederick B. DeBello, Cape Coral, FL (US)

(73) Assignee: Munters Corporation, Fort Myers, FL (US)

(*) Notice: Subject to any disclaimer, the term of this patent is extended or adjusted under 35 U.S.C. 154(b) by 0 days.

(21) Appl. No.: 09/295,372

(22) Filed: Apr. 21, 1999

(51) Int. Cl.$^7$ .......................... F16K 31/18; F16K 31/22; F16K 33/00; B01F 3/04
(52) U.S. Cl. .......................... 137/238; 62/171; 62/304; 62/315; 119/72; 119/437; 137/239; 137/334; 137/357; 137/391; 137/433; 137/107; 261/97; 261/98; 261/106; 261/DIG. 41
(58) Field of Search .......................... 137/237, 238, 137/334, 338, 433, 107, 131, 135, 143, 151, 175, 179, 192, 202, 204, 215, 216, 239, 356, 357, 391; 119/72, 80, 78, 437; 261/98, 106, 110, 111, 112.1, DIG. 15, DIG. 41, 97; 62/428, 171, 304, 315

(56) References Cited

U.S. PATENT DOCUMENTS

| | | | |
|---|---|---|---|
| 568,684 | 9/1896 | Howard et al. | 137/177 |
| 1,521,883 * | 1/1925 | Hess | 137/433 |
| 2,793,648 | 5/1957 | Brown et al. | 137/184 |
| 3,322,405 * | 5/1967 | Knudson et al. | 261/106 |
| 3,620,228 * | 11/1971 | Schmid | 137/237 |
| 3,947,532 * | 3/1976 | Skold et al. | 261/112 |
| 4,031,180 * | 6/1977 | Bohanon | 261/106 |
| 4,286,573 * | 9/1981 | Nickel | 126/362 |
| 4,389,352 * | 6/1983 | Bohanon, Sr. | 261/106 |
| 4,640,306 * | 2/1987 | Fan | 137/390 |
| 4,715,345 | 12/1987 | Reames, Jr. | 123/512 |
| 4,722,744 | 2/1988 | Stoll | 55/219 |
| 4,860,782 | 8/1989 | Fujiwara et al. | 137/193 |
| 5,121,768 * | 6/1992 | Thompson | 137/312 |
| 5,121,770 * | 6/1992 | Thompson | 137/312 |
| 5,130,063 * | 7/1992 | Collins et al. | 261/106 |
| 5,201,340 | 4/1993 | Teepe | 137/433 |

* cited by examiner

Primary Examiner—George L. Walton
(74) Attorney, Agent, or Firm—Fitzpatrick, Cella, Harper & Scinto

(57) ABSTRACT

An automatic flush water distribution system for use in an evaporative cooling system includes a water distribution pipe adapted to be connected to a source of pressurized water. The pipe has a plurality of water distribution ports formed therein and a vertical flush pipe is connected at a first end to the water distribution pipe in liquid communication therewith. The flush pipe includes a second lower end and contains at least one valve seat and at least one buoyant float valve located therein between the valve seat and the water distribution pipe. The float valve and valve seat have mating surfaces so that when pressurized water is applied to the water distribution pipe, the float valve is held by water pressure against the valve seat, and when the water pressure is relieved, the float valve floats in the flush pipe, opening the valve and allowing the water to be discharged through the second end of the flush pipe, thereby creating a partial vacuum in the water distribution pipe to draw atmospheric air through the port to dislodge debris therein.

10 Claims, 5 Drawing Sheets

FIG. 3A  FIG. 3B

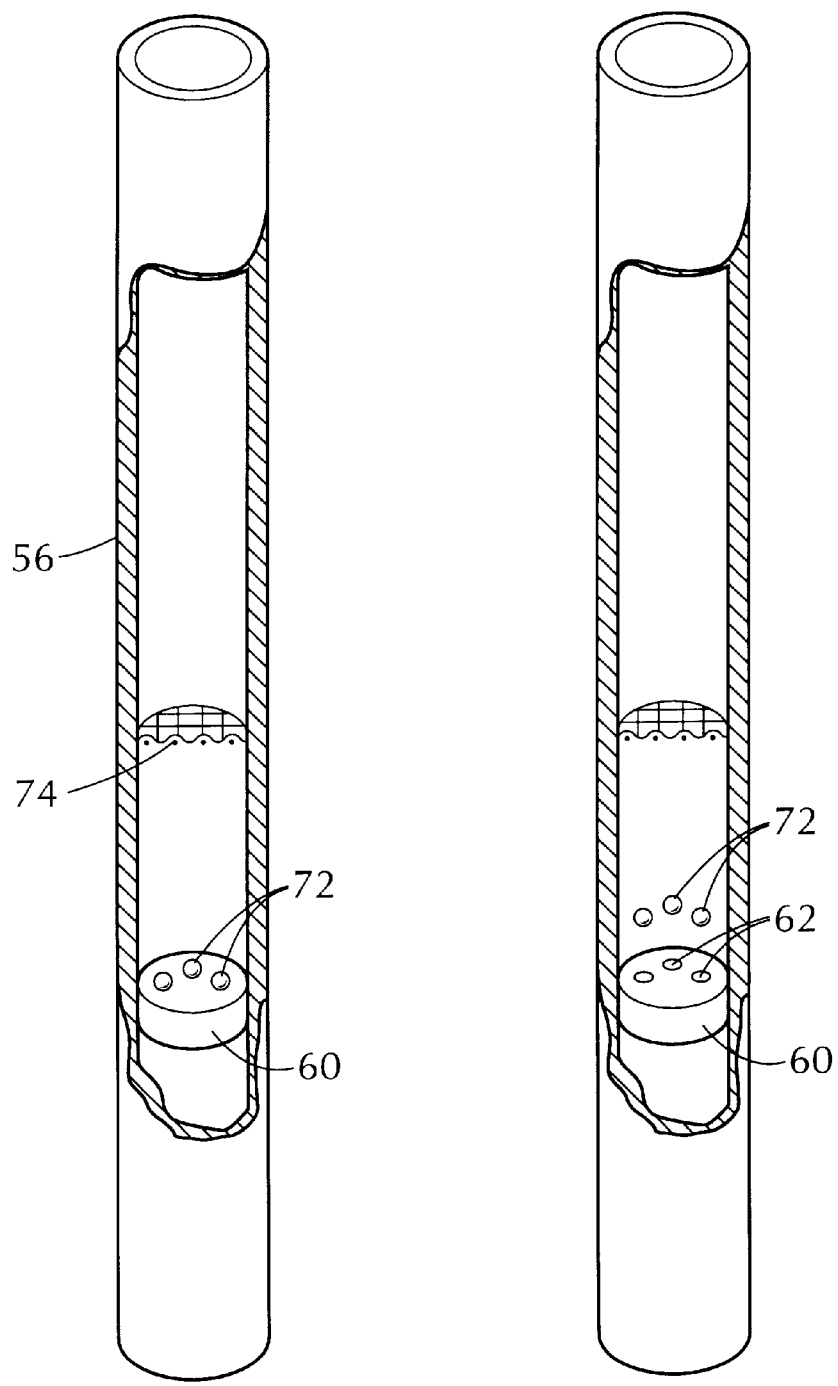
FIG. 5A  FIG. 5B

AUTOMATIC FLUSH VALVE

BACKGROUND OF THE INVENTION

The present invention relates to an automatic flush system for use with evaporative coolers.

Evaporative cooling systems are used in greenhouses, poultry houses and livestock installations for conveniently and economically cooling the interior of such buildings. These cooling systems are typically installed in a wall of the building and contain a pad or fill material, often of corrugated impregnated paper or the like, which receives water from a water distribution pipe located above an upper edge of the fill so that the fill is water soaked as the water passes through it. Outside air is drawn through the fill in cross or counter-current relationship to the water causing the evaporation of the water which cools the air. The thus cooled air is then supplied to the interior of the building.

A typical evaporative cooling installation uses a water distribution pipe extending above the upper edge of the evaporative cooling media, or fill, equipped with small holes, nozzles or ports that normally spray water upwards into a cover or splash plate from where it is distributed downwardly into the fill. Because these cooling systems are normally installed outdoors, debris in the form of insects, leaves, small sticks and the like invariably fall onto the water sump and get into the water distribution system. Some of this debris lodges in the holes of the water distribution pipe, clogging those holes. As a result, it is necessary to periodically clean the distribution pipe and its water discharge holes.

One previously proposed flushing system for water distribution pipes is to simply provide a discharge port at the end of the water distribution pipe, either horizontally or on a vertical leg of the pipe. The port is closed with a valve during normal operation of the system. However, periodically, the valve is opened during operation to flush out debris in the pipe. The problem with this system is that it is not automatic and the operators of the poultry house or greenhouse often forget to perform this flushing operation.

It is an object of the present invention to provide an automatic flushing system for evaporative cooler water distribution supplies.

Another object of the present invention is to provide an automatic flushing system which will both flush the pipe and clean the water distribution holes.

Yet another object of the present invention is to provide an automatic flushing system for an evaporative cooler water distribution supply which operates each time the water distribution supply is turned off.

Yet another object of the present invention is to provide a convenient and inexpensive automatic flushing system.

SUMMARY OF THE INVENTION

In accordance with an aspect of the present invention, a water distribution system for use in an evaporative cooler is provided which is adapted to be selectively connected to a source of pressurized water. The water distribution system includes a generally horizontal water distribution pipe adapted to be connected to the source of pressurized water. The water distribution pipe has a plurality of water distribution ports, holes or nozzles formed therein to discharge water in a generally vertical direction when pressurized water is connected to the pipe. The water distribution pipe also includes a vertically extending flush pipe having a first end connected in liquid communication with the water distribution pipe and a second open lower end. The flush pipe has a valve seat mounted or formed therein between its first and second ends and at least one float valve in the flush pipe between the first end thereof and the valve seat. The float valve and valve seat have mating surfaces whereby when pressurized water is applied to the water distribution pipe to discharge water from the discharge ports, a pressure differential is produced across the float valve holding it on the valve seat to prevent water discharge from the flush pipe. When pressurized water is shut off from the system, water pressure in the system decreases to a static pressure whereby the float valve floats in the flush pipe and moves upwardly away from its seat thereby allowing water to discharge from the flow pipe and creating a partial vacuum in the system which draws atmospheric air through the water discharge ports of the distribution pipes to dislodge debris therein while flushing the interior of the pipe.

The above, and other objects, features and advantages of this invention will be apparent in the following detailed description of illustrative embodiments thereof, which is to be read in connection with the accompanying drawings wherein:

DESCRIPTION OF THE DRAWINGS

FIGS. 5A and 5B are perspective views with parts broken away showing the flush valve system of FIG. 4.

DETAILED DESCRIPTION

Figure 1:
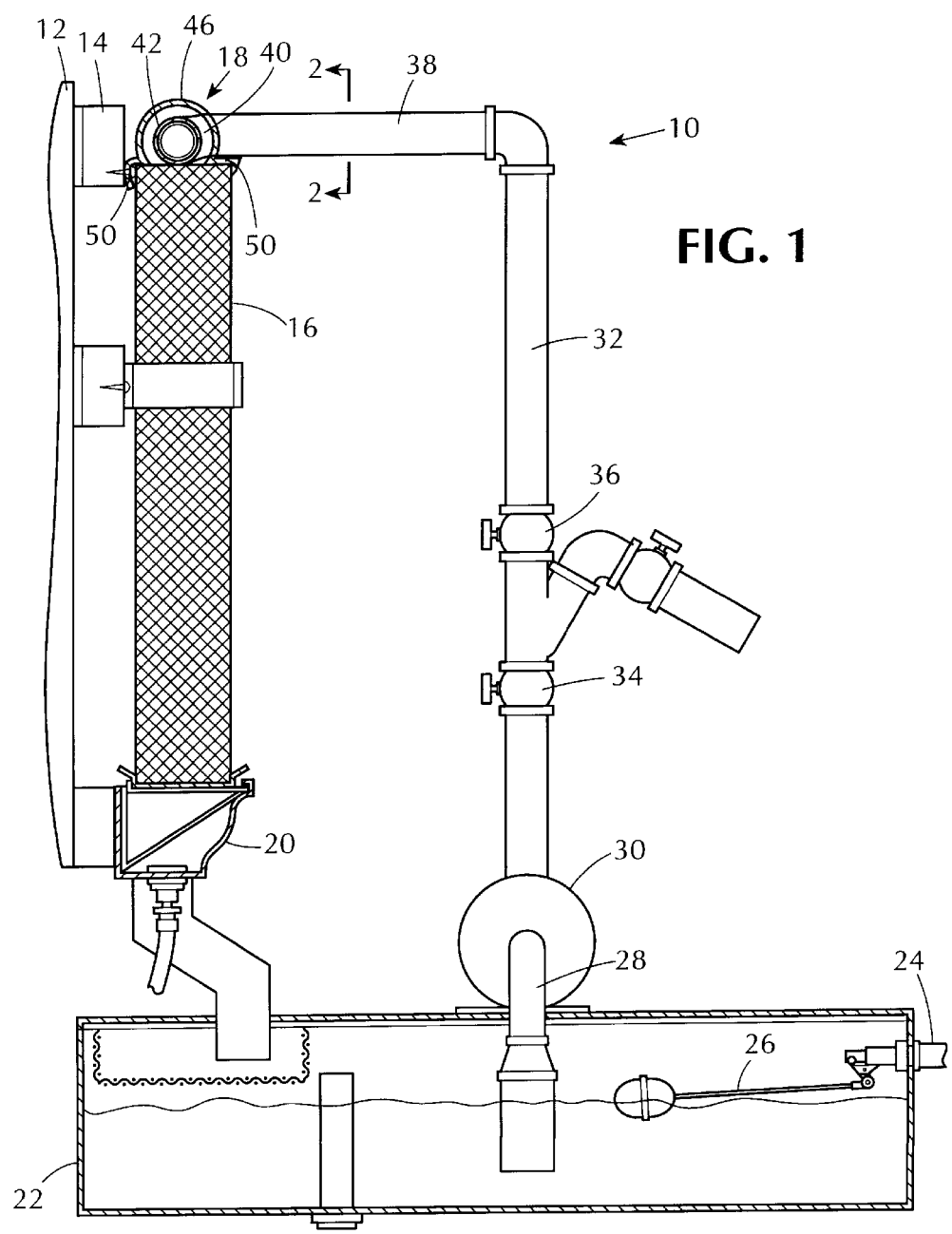
FIG. 1 is a schematic side view of an evaporative cooling system utilizing the automatic flush system of the present invention.

Referring now to the drawing in detail, and initially to FIG. 1, an evaporative cooling system 10 of generally conventional construction, as shown for example in U.S. Pat. No. 4,031,180 (the disclosure of which is incorporated herein by reference), is illustrated. The system 10 is adapted to be secured to an opening formed in the side wall 12 of a poultry house or greenhouse.

System 10 is secured to framing 14 around the opening in the side wall of the poultry house in any convenient manner. It includes an evaporative cooling media body 16, or fill, formed of cross corrugated film material in the known manner. A water distribution system 18 located above the cooling media 16 supplies water to the top of the body or fill 16. The water trickles through the fill to a gutter 20 which discharges the water into a sump 22. A fan (not shown) draws air from the exterior of the building 12 through the fill 16 cross-current to the water flowing in the fill to cause evaporative cooling of the air, which cooled air is then supplied to the poultry house.

Sump 22 is supplied with water through a main water supply conduit 24 which is provided with a float valve 26 that maintains the desired level of water in the sump. The water is pumped from the sump through a pipe 28 by a pump 30 in the known manner to a main supply conduit 32. The supply conduit includes a flow control valve 34 and a shutoff valve 36. The upper end 38 of conduit 32 is generally horizontal and extends to a T-intersection 40 to supply water to the horizontal water distribution pipe 42 of water distribution system 18.

Figure 2:
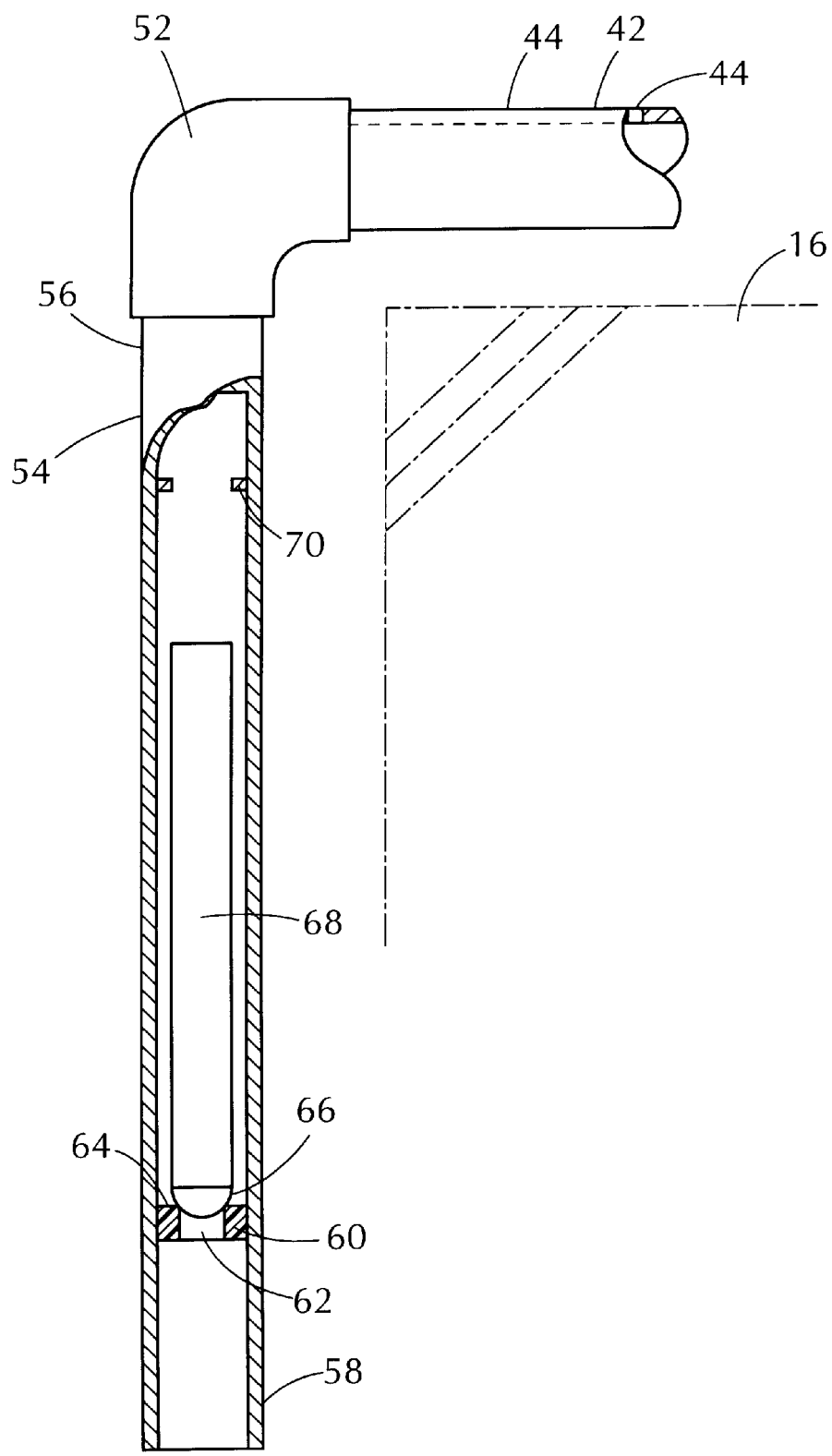
FIG. 2 is a partial side view taken along line 2—2 of FIG. 1, with parts broken away.

Water distribution pipe 42 is shown in part in FIG. 2. It extends horizontally above pad 16 and is held in place in any convenient manner. Pipe 42 has a series of outlet ports or openings 44 which may simply be holes in the side of the pipe or may include spray nozzles.

When water is supplied to the conduit 32 by pump 30 from sump 22 it flows through pipe 42 and is sprayed out of openings 44 against a cover or splash plate 46. As seen in FIG. 1, cover or splash plate 46 is generally semicircular in shape, but it could have other shapes, such as rectangular or triangular. The water deflected from splash plate 42 passes downwardly into the evaporative cooling media 16 where it passes in cross-current to the air drawn through the pad to cool the air as described above. Excess water from the pad 16 passes downwardly to gutter 20 and from there is returned to sump 22.

The upper end of the pad 16 has flashing 50 extending along its edges to support the upper end of the pad at its top.

Referring again to FIG. 2, water distribution pipe 42 is connected at one end to an elbow 52 from which a vertical flush pipe 54 extends. Flush pipe 54 has an upper end 56 connected to elbow 52 in liquid communication and an open lower end 58. The flush pipe includes, in the illustrative embodiment, an annular valve seat 60 mounted (or formed) therein in any convenient manner which has a central discharge port 62. A valve seating surface 64 is formed along the upper edge of the opening 62 for engagement with the valve surface 66 of a float valve 68.

Float valve 68 is formed of a buoyant material in any convenient manner and can move within flush pipe 56 towards and away from valve seat 64, depending upon the pressure of water in the pipe.

When the water distribution system is in operation and water under pressure is supplied by pump 30 to distribution pipe 42 through conduits 32, 38, the water pressure in pipe 42 and within flush pipe 54 acts on float valve 68 to urge it downwardly against valve seat 64 because of the differential in pressure on the opposite sides of the float. This seals flush tube 54 to prevent water from discharging therefrom. Thus substantially all of the water is discharged through ports 44 in pipe 42.

As discussed above, during the course of operation of the evaporative cooler, particularly because the system is located outside of the building, dirt and other debris can enter the system and potentially clog ports 44. Float valve 68 provides for automatic flushing of the system to dislodge and remove that debris.

Figure 3:
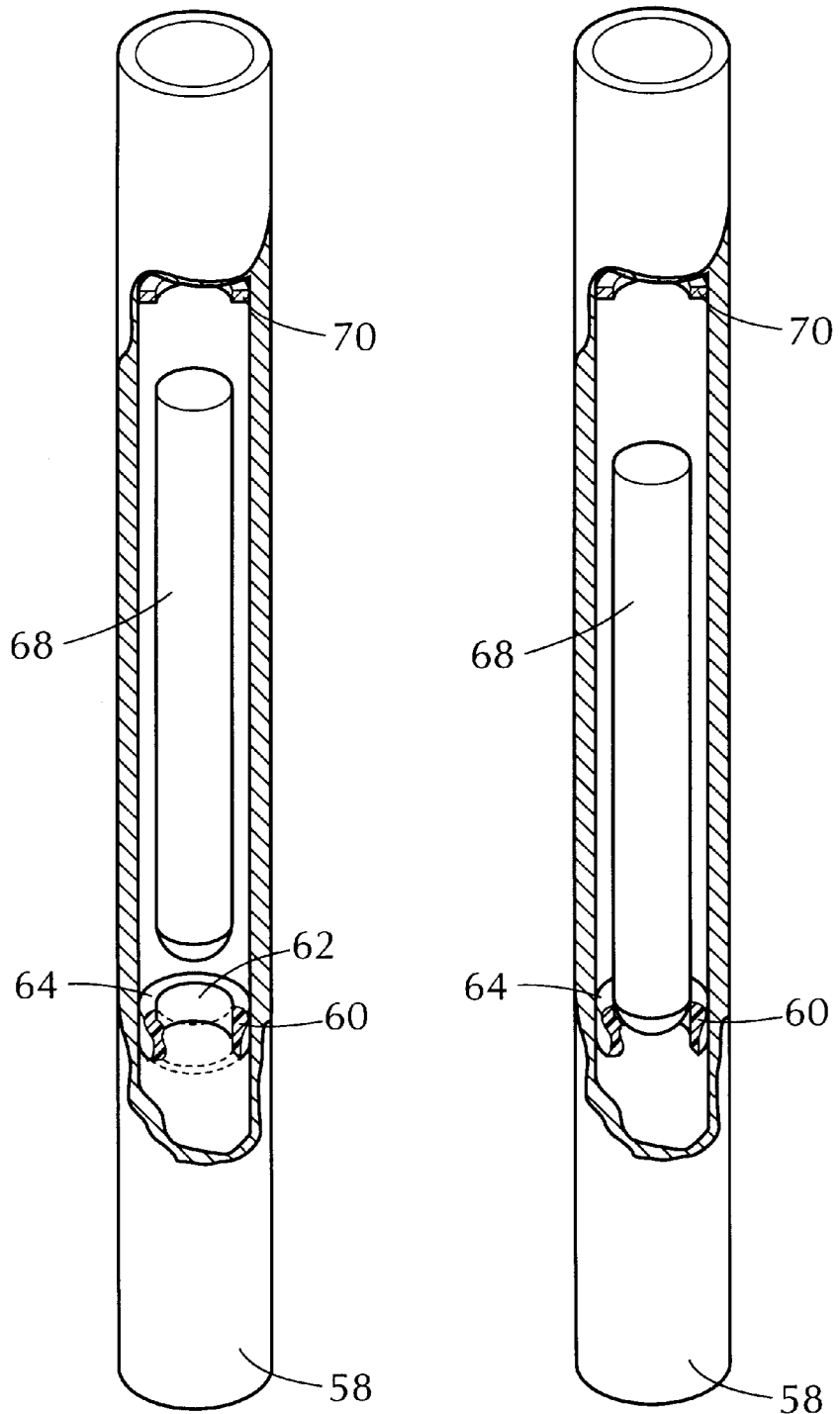
FIGS. 3A and 3B are perspective views of the vertical flush pipe shown in FIG. 2 with parts broken away and showing the open and closed position of the float valve.

When the water supply to pipes 32, 38 is shut off, the pressure in pipe 42 and flush tube 54 returns to a static pressure, thereby reducing the pressure differential on opposite sides of valve seat 64. This permits float valve 68 to float in flush tube 54, opening valve seat 60 and allowing water in pipes 42, 56 to flush, out of the system, as seen in FIG. 3A. If necessary, internal stops 70 can be provided on the internal walls of pipe 56 to prevent the float valve from rising too far away from seat 60.

The flushing of water through flush pipe 56 in this way causes debris within pipe 42 to be flushed out of the system. In addition, the rapid reduction in water pressure in pipe 42 creates a partial vacuum in pipe 42 drawing atmospheric air through ports 44 into the pipe. The rush of air through these ports inwardly into the pipe dislodges the debris in those ports and flushes the debris automatically from the system.

Figure 4:
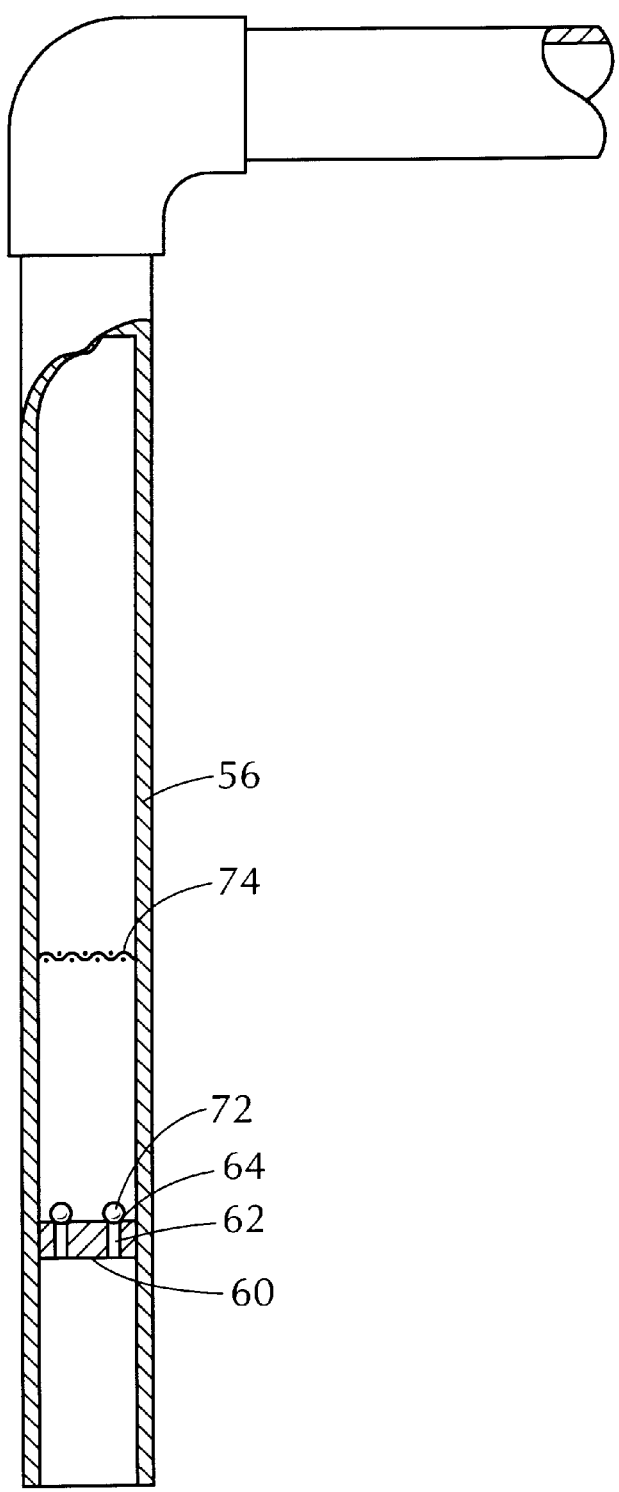
FIG. 4 is a view similar to FIG. 2 showing another embodiment of the invention.

In another embodiment of the invention illustrated in FIGS. 4 and 5, valve seat 60 is provided with multiple valve ports 62 and multiple float valves 72. In this embodiment each of the float valves is a spherical buoyant ball 72. As seen in FIG. 5A, when water pressure is applied to the system, the balls 72 engage valve surfaces 64 of ports 62 to close the ports and maintain pressure in the system. When water pressure is reduced by shutoff of the water supply to the water distribution pipe, valve balls 72 are free to float in the water within the flush pipe system, opening ports 62 and allowing water to flush from the system. If necessary, a screen 74 or other devices can be mounted within flush pipe 56 to prevent ball valves 72 from floating too high into the pipe.

In operation the flushing system provides automatic flushing of the water supply for the evaporative cooler. It achieves this result simply and economically.

Although illustrative embodiments of the present invention have been described herein with reference to the accompanying drawings, it is to be understood that this invention is not limited to those precise embodiments and that various changes and modifications may be affected therein by those skilled in the art without departing from the scope or spirit of this invention.

What is claimed is:

1. An automatic flush water distribution system adapted to be connected to a selectively opened or closed source of pressurized water, said system including a water distribution pipe adapted to be connected to said source of pressurized water, said pipe having a plurality of water distribution ports formed therein and a vertical flush pipe having a first end connected to and in liquid communication with said water distribution pipe and a second lower open end;

said vertical flush pipe including at least one valve seat and at least one buoyant float valve located in said flush pipe between said valve seat and the first end of the flush pipe, said float valve and said valve seat having mating surfaces wherein when pressurized water is applied to said water distribution pipe, the float valve is held closed by the pressurized water against the valve seat and when the source of pressurized water is closed, water pressure in the water distribution pipe is relieved and the float valve floats in the flush pipe opening the valve and allowing remaining water in the distribution pipe to be discharged through the second end of the flush pipe, thereby creating a partial vacuum in the water distribution pipe to draw atmospheric air through said ports to dislodge debris therein.

2. A system as defined in claim 1 wherein said water distribution pipe is normally operated in a horizontal position.

3. A system as defined in claim 2 wherein said water distribution ports are directed upwardly.

4. A system as defined in claim 1 wherein said at least one float valve is a buoyant generally cylindrical member having a lower end formed to mate in generally water tight relation with said valve seat.

5. A system as defined in claim 1 wherein said at least one float valve comprises a plurality of float valves and said at least one valve seat comprises a plurality of valve seats formed therein for mating in sealing relation with said float valves.

6. A system as defined in claim 5 wherein said float valves are a plurality of buoyant balls.

7. A water distribution system for use in an evaporative cooler and adapted to be selectively connected to a source of pressurized water, said system including a generally horizontally extending water distribution pipe adapted to be selectively connected to said source of pressurized water, said water distribution pipe having a plurality of water distribution ports formed therein to discharge water in a generally upward vertical direction when the pressurized source of water is connected to the water distribution pipe, and a vertically extending flush pipe having a first end connected in liquid communication with the water distribution pipe and a second open lower end, said flush pipe having means for forming at least one valve seat mounted therein between said first and second ends of the flush pipe and at least one float valve in the flush pipe between the first end thereof and the valve seat, said float valve and valve seat having mating surfaces whereby when the source of pressurized water is connected to the water distribution pipe pressurized water is discharged from the water distribution pipe's discharge ports and the pressurized water produces a pressure differential across the float valve holding it on the valve seat to prevent water discharge from the flush pipe and when the source of pressurized water is disconnected from the system, water pressure in the system decreases to a static pressure whereby the float valve floats in the flush pipe allowing water to discharge from the flush pipe creating a partial vacuum in the system drawing atmospheric air through the water discharge ports of the distribution pipes to dislodge debris therein.

8. A system as defined in claim 7 wherein said at least one float valve is a buoyant generally cylindrical member having a lower end formed to mate in generally water tight relation with said valve seat.

9. A system as defined in claim 7 wherein said at least one float valve comprises a plurality of float valves and said at least one valve seat comprises a plurality of valve seats for mating in sealing relation with said float valves.

10. A system as defined in claim 9 wherein said float valves are a plurality of buoyant balls.

* * * * *